April 17, 1956 E. N. PHILLIPS 2,742,608
TESTER FOR DIRECTIONAL COUPLER DIRECTIVITY
Filed April 16, 1954 5 Sheets-Sheet 1
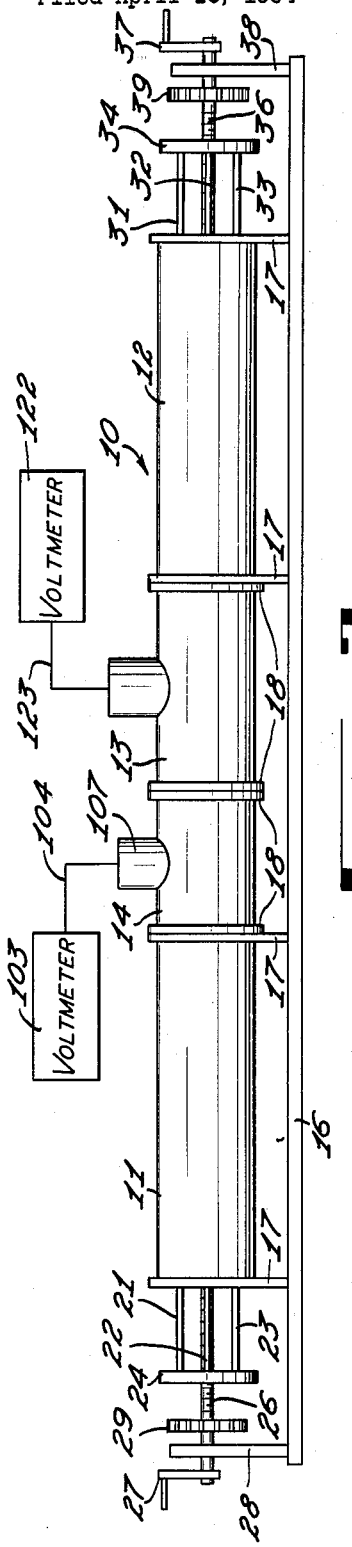
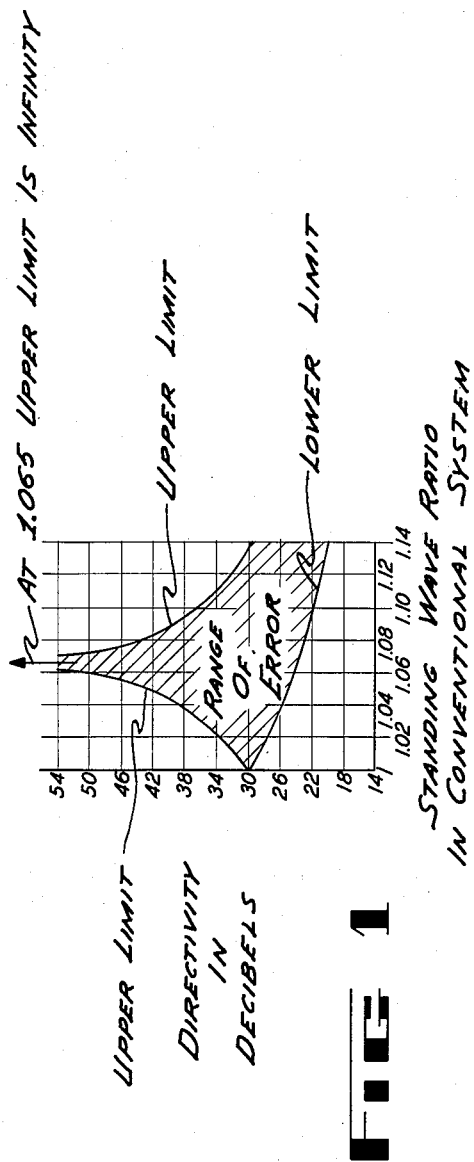
INVENTOR.
EDWIN N. PHILLIPS
BY
ATTORNEY

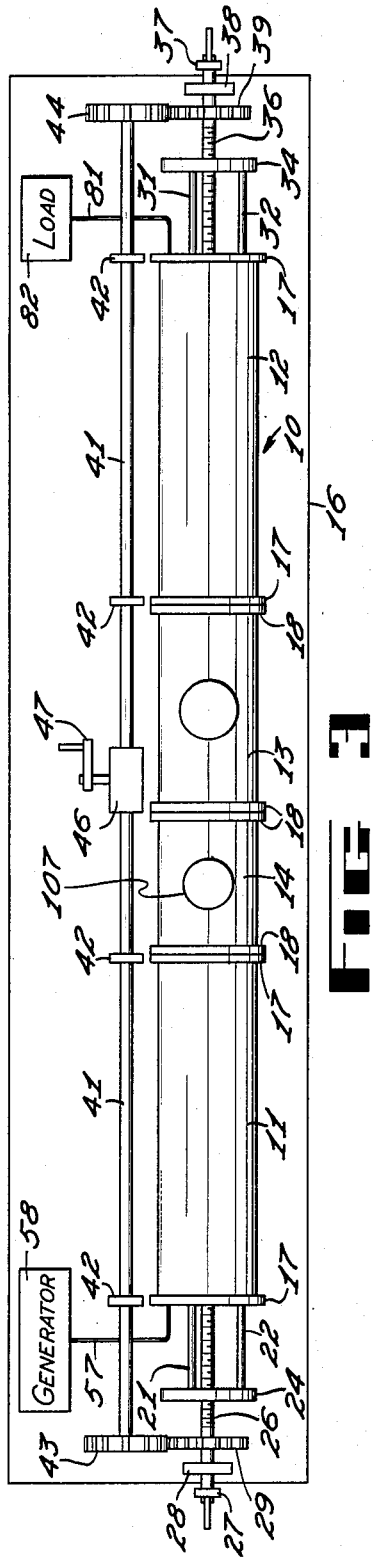
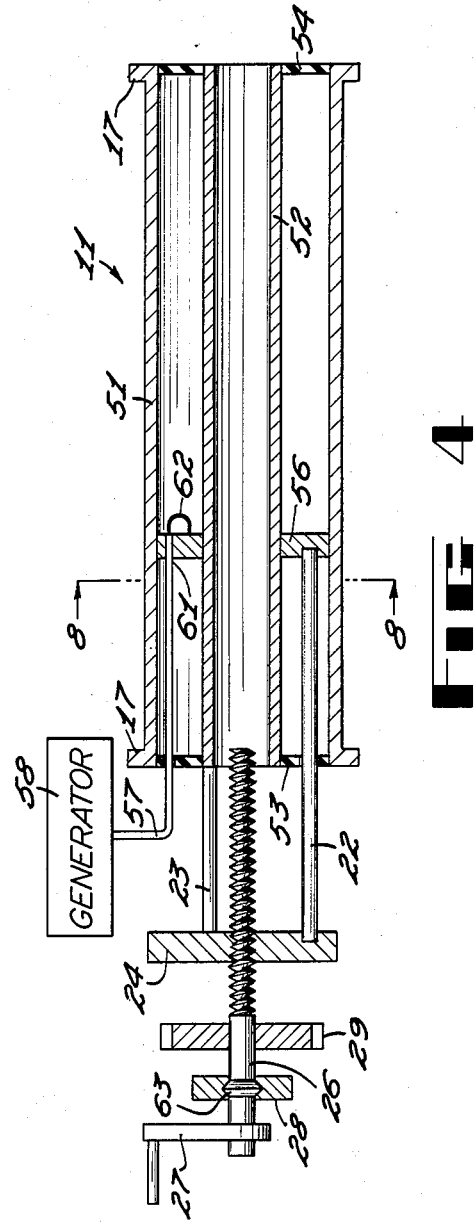

April 17, 1956 E. N. PHILLIPS 2,742,608
TESTER FOR DIRECTIONAL COUPLER DIRECTIVITY
Filed April 16, 1954 5 Sheets-Sheet 3
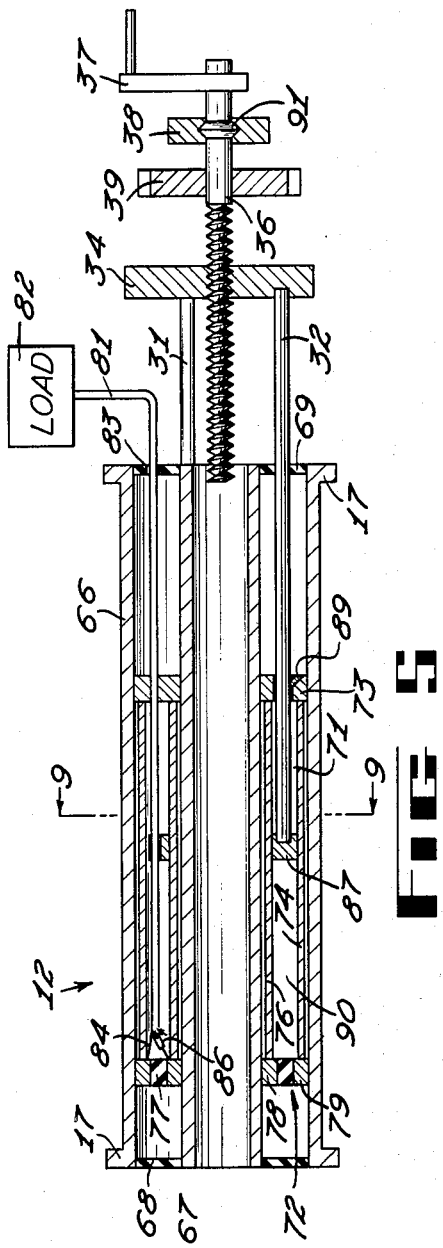
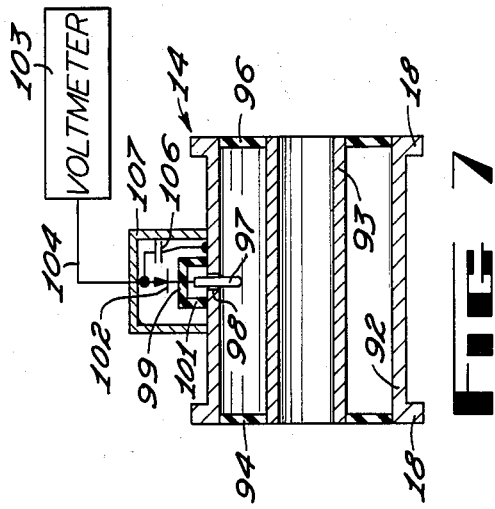
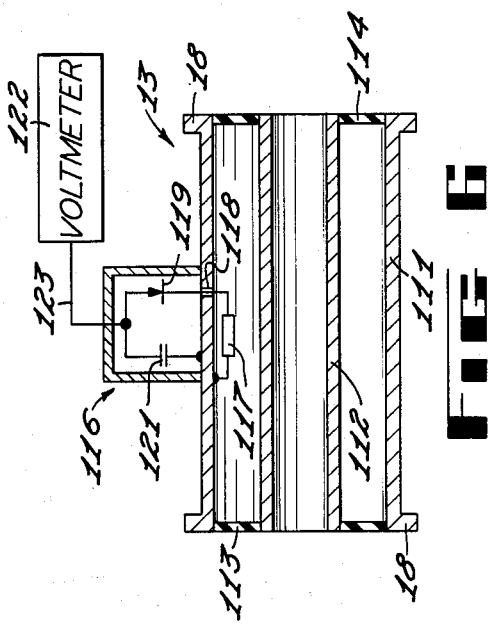
INVENTOR.
EDWIN N. PHILLIPS
BY
ATTORNEY April 17, 1956 E. N. PHILLIPS 2,742,608
TESTER FOR DIRECTIONAL COUPLER DIRECTIVITY
Filed April 16, 1954 5 Sheets-Sheet 4
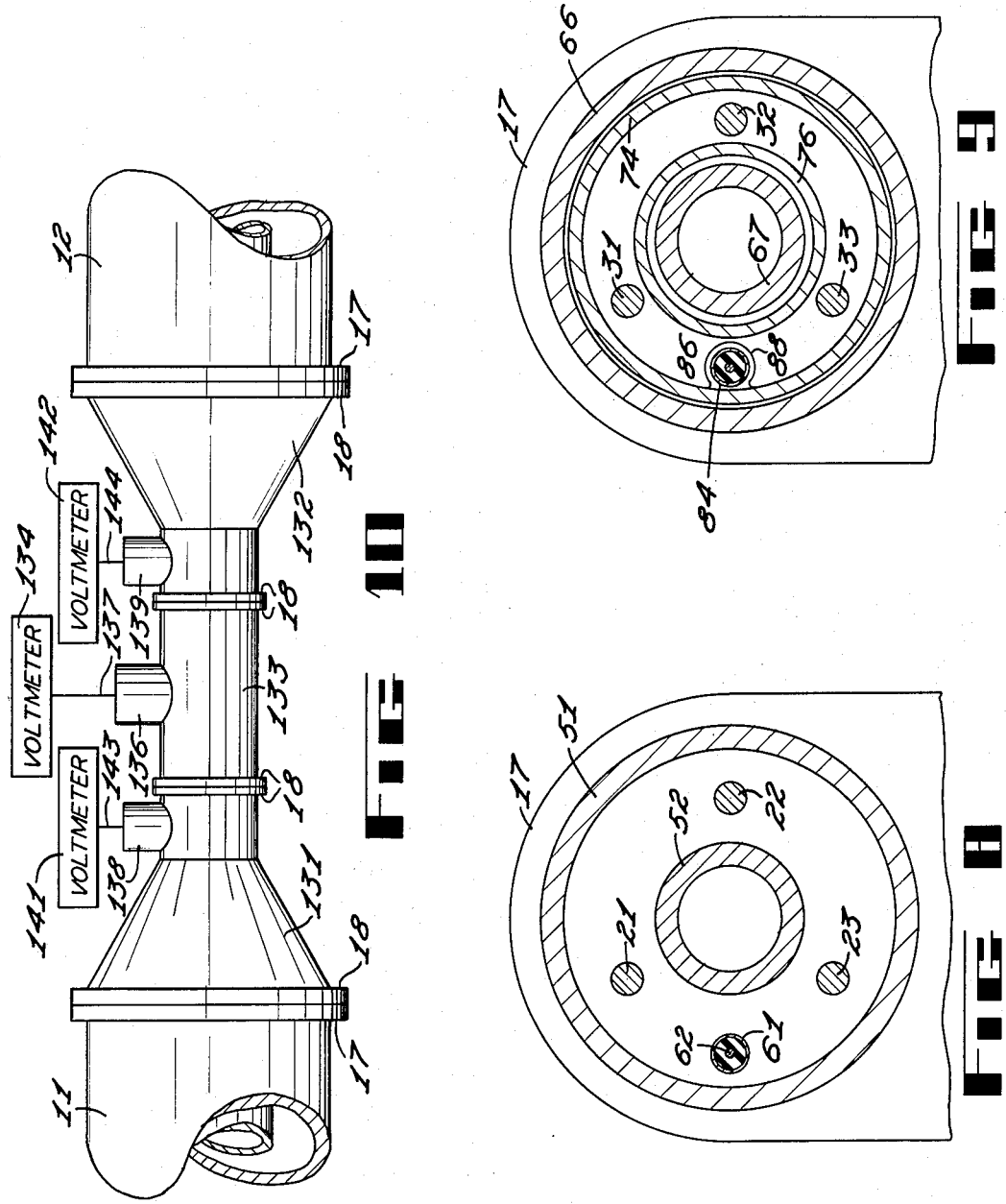
INVENTOR.
EDWIN N. PHILLIPS
BY
ATTORNEY

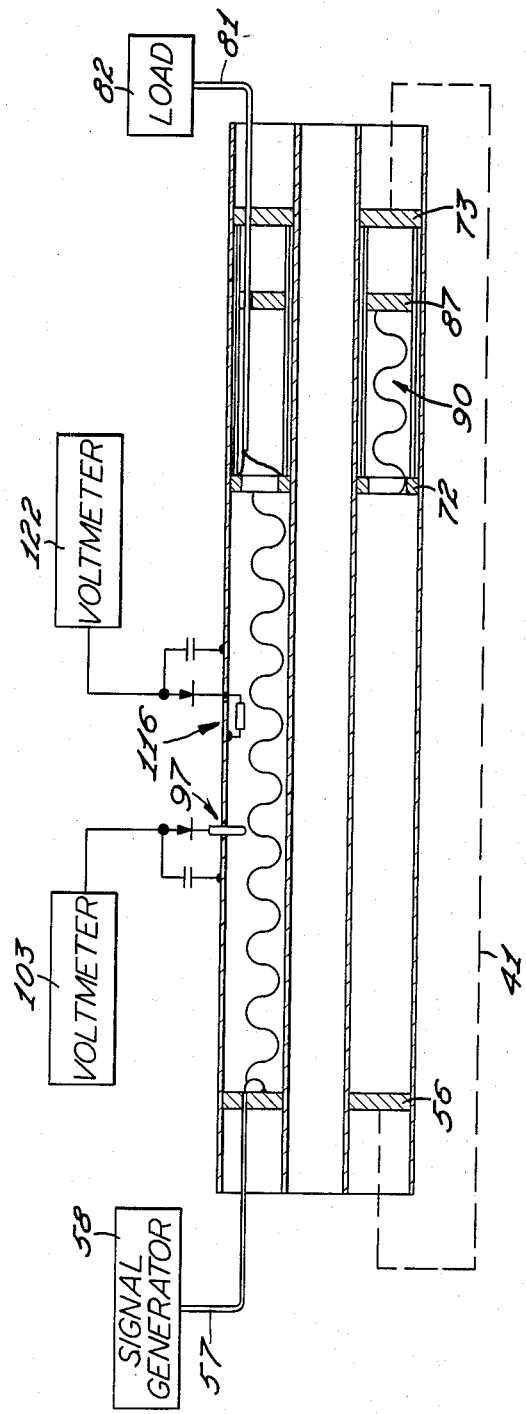

United States Patent Office 2,742,608
Patented Apr. 17, 1956

2,742,608

TESTER FOR DIRECTIONAL COUPLER DIRECTIVITY

Edwin N. Phillips, Cedar Rapids, Iowa, assignor to Collins Radio Company, Cedar Rapids, Iowa, a corporation of Iowa Application April 16, 1954, Serial No. 423,637

12 Claims. (Cl. 324—58)

This invention involves means for testing the directivity of directional couplers.

A directional coupler may be defined as an electronic device used to sense power flowing in a single direction in a high frequency transmission line. Directional couplers find particular use as power measuring devices in high frequency transmission lines and are being increasingly used because of their reliability, small size and simplicity. This invention is primarily concerned with their accuracy, which often has been an unknown quantity because conventional methods of determining accuracy have been inaccurate.

Directional couplers are placed in a transmission line in one angular position to sense power flowing in one direction and are reversed 180 degrees in position to measure power flowing in the opposite direction. Accordingly in this specification, the position, in which the coupler is most sensitive to incident power, is called forward position; and the position, in which the coupler is most sensitive to reflected power, is called backward position.

An ideal directional coupler only senses power flowing in a single direction, corresponding to its position, and provides an output that is proportional to the sensed power. In practice, however, the ideal characteristic is seldom, if ever, obtainable, because the ordinary directional coupler will also sense, to a lesser degree, power travelling in the opposite direction; and its voltage output is hence a function of power travelling in both directions. The better the coupler, the less is its sensitivity to power flowing in the opposite direction.

The directivity of a directional coupler is determined by its discrimination between incident and reflected power and is mathematically defined by the following formula which presumes a transmission line that has incident power but no reflected power, $$D = \frac{V_f}{V_b} \quad (1)$$

where $V_f$ is the coupler's output voltage when it is in forward position, and $V_b$ is the coupler's output voltage when it is in backward position. Because there is no reflected power, the output provided in backward position is a measure of the coupler's imperfection since zero output would be obtained from an ideal coupler in such position.

The conventional method of determining directivity requires a transmission line with a perfectly matched load in order to have only incident power. The directional coupler is placed firstly in a forward position, where its output voltage is $V_f$, and is placed secondly in backward position, where its output voltage is $V_b$. The voltage $V_b$ should theoretically be zero but in all known cases has a value which is often substantial. The voltages $V_f$ and $V_b$, as thus obtained, are used in Formula 1, and the directivity of the coupler is known.

Although theoretically perfect, the conventional system of measuring directivity suffers from an unavoidability defect in practice. It is impossible in practice to provide a perfectly matched line. I have discovered that an extraordinarily slight amount of mismatch in the conventional system will cause a large error in measured directivity. Figure 1 illustrates in regard to the conventional system the large range of error caused in measured directivity by very small amount of reflected power which is indicated by the very small standing wave ratios. Figure 1 uses as an example a directional coupler that has an actual directivity of 30 decibels which is observed when there is no reflected power (shown by a standing wave ratio of one). It is seen that the range of error diverges rapidly with a slight increase in standing wave ratio, and at a standing wave ratio of 1.065 is between the limits in decibels of from 24 to infinity. Directivity is here conveniently expressed in decibels according to the formula:

$$D_{db} = 20 \log \frac{V_f}{V_b} \quad (2)$$

It is therefore an object of this invention to provide a directivity tester which does not require a perfectly matched load.

It is, on the other hand, another object of this invention to provide a directivity tester which uses standing waves.

It is accordingly another object of this invention to provide a directional coupler tester which gives exact results with an unmatched load.

It is a further object of this invention to provide a directional coupler tester which can measure directivity without reversing the position of a directional coupler.

It is still another object of this invention to provide directional coupler testing means which avoids movable probes in slotted waveguide walls that cause uncontrollable variations in coupling between the directional coupler and the transmission line and thus cause undesirable variations in coupler output voltage.

It is a further object of this invention to provide directional coupler testing means that does not require a buffer pad between the signal generator and the tester input.

It is a still further object of this invention to provide a testing means for a directional coupler that is permanently built into a section of waveguide which is insertable as a unit into a transmission system.

It is yet another object of this invention to provide a tester which permits insertion of different diameter waveguide sections containing directional couplers.

It is another object of this invention to provide a tester capable of measuring the frequency response of a directional coupler.

It is a further object of the invention to provide a tester capable of measuring the insertion discontinuity of a directional coupler.

The invention provides in a transmission line a standing wave pattern which is moved beneath both a directional coupler and a nondirectional probe that are fixed in the line. The information required to calculate directivity is obtained from the maximum and minimum outputs of the coupler and probe.

The standing wave pattern in the invention is maintained between plungers located at opposite ends of the line, and a constant axial distance is maintained between the plungers as they are moved. An input signal is provided at one plunger and an output is taken at the other plunger which contains a stub that is adjusted to provide a required mismatch. The input and output impedances of the transmission line are maintained constant so that there is no variation in the standing wave as it is moved.

Further objects, advantages and features of the invention will be apparent to a person skilled in the art upon further study of the specification and drawings, in which:

Figure 1 is a diagram which shows the range of error in measured directivity as determined by the conventional method when the standing wave ratio is varied slightly from one.

Figure 2 is a side elevational view of an embodiment of the invention;

Figure 3 is a top view of the embodiment shown in Figure 2;

Figure 4 illustrates a top sectional view of the input portion of the invention;

Figure 5 illustrates a top sectional view of the output portion of the invention;

Figure 6 illustrates a sectional view of a transmission line insert containing a directional coupler;

Figure 7 illustrates a sectional view of a transmission line insert containing a nondirectional probe;

Figure 8 is a cross sectional view taken along section 8—8 in Figure 4;

Figure 9 is a cross sectional view taken along section 9—9 in Figure 5;

Figure 10 is an elevational view of portions of another embodiment of the invention; and Figure 11 illustrates an operational diagram.

The chosen embodiment described herein uses a coaxial type waveguide. It is to be realized that this invention may also use hollow type waveguide.

Now referring to the invention in more detail, Figures 2 and 3 show elevational views of an embodiment which uses coaxial waveguide 10 comprising an input portion 11, an output portion 12, a directional coupler portion 13, and a nondirectional probe portion 14. A base plate 16 mechanically supports waveguide 10 by means of a plurality of brackets 17 which fasten to plate 16 the ends of portions 11 and 12. Directional coupler portion 13 and nondirectional probe portion 14 are supported between input and output portions 11 and 12 by the flanges 18 at their ends which are fastened by bolts or other suitable fastening means (not shown).

Three rods 21, 22 and 23 extend from input portion 11 and are fastened at their outer ends to a collar 24. A shaft 26, with a crank 27 fixed at one end, is supported rotatably and longitudinally by an upright 28 mounted on plate 16. The other end of shaft 26 is threadedly received in collar 24 and a gear 29 is fixed intermediately on shaft 26.

In a similar manner, three rods 31, 32 and 33 extend from output portion 12 and fasten to a second collar 34 that threadedly receives one end of a shaft 36. The other end of shaft 36 terminates with a crank 37 and is supported rotatably and longitudinally by an upright 38 fastened to base plate 16, and a gear 39 is mounted on shaft 36.

A connecting shaft 41 is rotatably supported by a plurality of bearings 42 mounted on base plate 16. A gear 43 is fixed at one end of connecting shaft 41 and engages gear 29. A second gear 44 is fastened to the other end of connecting shaft 41 and engages gear 39. A transmission 46 is centrally located on base plate 16 and rotatably couples a third crank 47 to connecting shaft 41.

Figure 4 shows a top sectional view of input portion 11 which has an outer conductor 51 and a hollow inner conductor 52 that is supported within outer conductor 51 by the dielectric spacers 53 and 54 located at the ends of input portion 11. A plunger 56 of conducting material is slideably mounted between inner and outer conductors 51 and 52 and is connected to the rods 21, 22 and 23 which slideably pass through respective holes in dielectric spacer 53. A small diameter coaxial cable 57, which also is slideably received through a hole in spacer 53, is connected at one end to a signal generator 58 and is connected at its other end to plunger 56. Its outer conductor 61 is connected directly to plunger 56 but its inner conductor 62 is formed into loop before it connects to plunger 56.

A boss 63 is provided on shaft 26 and is supported in upright 28 to prevent longitudinal movement of shaft 26. The threaded engagement between shaft 26 and collar 24 allows plunger 56 to be moved longitudinally when shaft 26 is rotated by either crank 27 or gear 29.

Figure 5 illustrates a top sectional view of output portion 12 which has an outer conductor 66 and a hollow inner conductor 67 that is supported at its ends by thin dielectric spacers 68 and 69. An output plunger assembly 71 is slideably supported between inner and outer conductors 66 and 67. Assembly 71 has a front annulus 72 and a back annulus 73 which are fixed together by an outer cylindrical tube 74 and an inner cylindrical tube 76.

Back annulus 73 may be made of conducting material, but front annulus 72 has an intermediate dielectric ring 77 that supports inner and outer conducting rings 78 and 79 which are connected to tubes 76 and 74, respectively. Rings 78 and 79 slideably contact inner and outer conductors 67 and 66.

A small diameter coaxial cable 81 is connected at one end to a load 82 and slideably passes through a hole 83 in dielectric spacer 69. Cable 81 passes fixedly through back annulus 73, and its outer conductor 84 is connected to outer ring 79 and its inner conductor 86 is connected to inner ring 78.

A stub plunger 87 of conducting material is slideably supported in plunger assembly 71 between inner and outer tubes 76 and 74 (also see Figure 9). The three conducting rods 31, 32 and 33, which have one of their ends connected to collar 34, slideably pass through respective holes in dielectric spacer 69 and back annulus 73, and the rods connect to stub plunger 87. A cutaway portion 88 of plunger 87 allows cable 81 to freely pass through it. A set screw 89 in back annulus 73 clamps rod 32 to plunger assembly 71 and fixes the position of plunger 87 in plunger assembly 71. The output plunger assembly is hence moved as a unit by rods, 31, 32 and 33. A boss 91 on shaft 36 is supported in upright 38 and prevents longitudinal movement of shaft 36. The threaded engagement between shaft 36 and collar 34 allows plunger assembly 71 to be moved longitudinally when shaft 36 is rotated by either gear 39 or crank 37.

Probe portion 14 is illustrated in Figure 7 and has an outer conductor 92 and an inner conductor 93 which is supported by thin dielectric spacers 94 and 96. A capacitive type probe 97 extends through a hole 98 in outer conductor 92 and is supported by a dielectric plate 99 that is fastened to the upper end of a cylindrical housing 101 which has its other end fixed to outer conductor 92. A crystal diode 102 has one end connected to probe 97, and its other end connected to a voltmeter 103 by means of a lead 104. A capacitor 106 is connected between the output end of diode 102 and outer conductor 92. A casing 107, fixed to outer conductor 92, shields the diode detector circuit and provides a waveguide below cutoff to prevent radiation through hole 98. Probe portion 14 may use any type of nondirectional probe and the capacitive type is merely shown for illustrative purposes.

Directional coupler section 13 which is best shown in Figure 6 has an outer conductor 111 and an inner conductor 112 which is supported by means of thin dielectric supports 113 and 114. A directional coupler 116 is supported by outer conductor 111 and has a resistor 117 connected at one end to the inner side of outer conductor 111. The other end of resistor 117 passes insulatingly through a hole 118 in outer conductor 111 and connects to one end of a crystal diode 119. A capacitor 121 is connected between the output end of crystal diode 119 and outer conductor 111 while a voltmeter 122 is connected to the output of detector diode 119 by means of lead 123. The resistive type directional coupler is used only for purposes of illustration and any type of directional coupler might be used, as for example, a single hole type or a double hole type of directional coupler.

Figure 10 illustrates portions of another embodiment that replace portions 13 and 14 shown in the embodiment of Figure 2. The present embodiment is used to test a directional coupler that is fixed to an insertable section of transmission line of different diameter than input and output portions 11 and 12. A pair of tapered sections 131 and 132 are coupled to line portions 11 and 12 and provide a uniform change to the diameter of a directional coupler portion 133 fastened between them. Coupler 133 is substantially the same as directional coupler portion 13 except for diameter, and the diameter of portion 133 may be greater or smaller than line portions 11 and 12. Tapered sections 131 and 132 must accordingly match the difference in diameter. A voltmeter 134 is connected to directional coupler 136 on portion 133, and nondirectional probes 138 and 139 are connected to the voltmeters 141 and 142 by leads 143 and 144. The remaining elements of this embodiment are the same as required for the embodiment shown in Figures 2 and 3.

Mechanically, in either embodiment, whenever any of the cranes 27, 37 or 47 are rotated, shafts 26, 36 and 41 rotate because of their geared coupling. Rotation of shafts 26 and 36 in collars 24 and 34 longitudinally moves input plunger 56 and output plunger assembly 71 because of the threaded connection between the shafts and collars. Shafts 26 and 36 are threaded in such manner and with the same pitch so that opposing plungers 56 and 71 move in the same direction and always maintain a constant distance. Plunger movement should be approximately one-half wave length of the lowest signal frequency.

The output of waveguide 10 is removed by cable 81 and transmitted to load 82 which need not be matched to cable 81. Output plunger assembly 71 includes a stub which presents an adjustable impedance at the connection between waveguide 10 and cable 81 and controls the output impedance of waveguide 10. The adjustment of output assembly 71 hence controls the standing wave ratio within waveguide 10. Front annulus 72 provides the connecting point between cable 81 and waveguide 10 and also provides the input to an adjustable coaxial stub 90 contained within output plunger assembly 71 between front annulus 72 and stub plunger 87. Stud 90 presents an impedance at its connection point (annulus 72) which is in parallel with the impedance of the load as viewed from waveguide 10. The impedance of stub 90 is preset by loosening set screw 89, moving stub plunger 87 to a required position in assembly 71, and relocking set screw 89. Thereafter, a constant impedance is maintained at the output of waveguide 10 as plunger assembly 71 is moved.

Likewise, the input impedance to waveguide 10 at plunger 56 remains constant because the length of waveguide between input plunger 56 and output plunger 72 remains constant. No attenuating pad is therefore required between the generator and waveguide input loop, and the standing wave amplitude remains constant as it is moved by the plungers.

The plungers 56 and 71 are moved approximately one-half wave length in order to assure that the nondirectional probe and directional coupler will sense at various times during plunger movement both a minimum and a maximum of the standing wave. The voltmeters will therefore indicate the maximum and minimum values sensed by the nondirectional probe and directional coupler, and the directivity of the directional coupler may be calculated from these values as is explained below.

A brief discussion of theory is useful in explaining further operation of the invention and may be followed more clearly by reference to Figure 11. A directional coupler is primarily sensitive to energy flowing in a selected direction, but is secondarily sensitive to energy flowing in the reverse direction. The output of a directional coupler therefore is not exactly proportional to either the reflected or incident waves but to components of both. A directional coupler thus provides in its two positions output voltages which are called "apparent incident voltage" when the coupler is positioned in a forward direction, and "apparent reflected voltage" when the coupler is positioned in a backward direction. Furthermore, standing waves within a transmission line affect the values of "apparent incident voltage" and "apparent reflected voltage."

When the coupler is positioned in a forward direction at a maximum point on the standing wave pattern, the "apparent incident voltage" is a maximum which is defined by the equation $$|V_f|_{max} = C\left(|V_i| + \left|\frac{V_r}{D}\right|\right) \qquad (3)$$

where $|V_f|_{max}$ is the maximum "apparent incident voltage," $V_i$ is the actual incident voltage, $V_r$ is the actual reflected voltage, $D$ is the directivity of the directional coupler, and $C$ is a proportionality constant.

When the coupler is positioned in the forward direction at a minimum point of standing wave pattern, the "apparent incident voltage" is a minimum which is defined by the equation $$|V_f|_{min} = C\left(|V_i| - \left|\frac{V_r}{D}\right|\right) \qquad (4)$$

where $|V_f|_{min}$ is the minimum "apparent incident voltage."

In a similar manner, when the coupler is positioned in a backward direction to read "apparent reflected voltage," the directional coupler's output voltage at a maximum point on the standing wave is $$|V_b|_{max} = C\left(\left|\frac{V_i}{D}\right| + |V_r|\right) \qquad (5)$$

where $|V_b|_{max}$ is the maximum "apparent reflected voltage."

The coupler's output voltage at the minimum point on the standing wave is $$|V_b|_{min} = C\left(\left|\frac{V_i}{D}\right| + |V_r|\right) \qquad (6)$$

where $|V_b|_{min}$ is the minimum "apparent reflected voltage," and the remaining terms are as defined above.

The directivity term $D$ may be extracted from Equations 3 and 4, and after manipulating the terms it is found that $$D = \left(\frac{P_f + 1}{P_f - 1}\right)\left(\frac{P - 1}{P + 1}\right) \qquad (7)$$

where $P$ is the "actual standing wave ratio" of the transmission line, and $P_f$ is the "apparent forward standing wave ratio" as seen by a directional coupler positioned in the forward direction, where it indicates "apparent incident voltage."

The directivity may also be extracted from Equations 5 and 6, and it is found that $$D = \left(\frac{P_b + 1}{P_b - 1}\right)\left(\frac{P + 1}{P - 1}\right) \qquad (8)$$

where $P$ is the "actual standing wave ratio" as stated above, and $P_b$ is the "apparent backward standing wave ratio" as seen by a directional coupler positioned in the backward direction, where it indicates "apparent reflected voltage."

The value of directivity determined by Formula 7 is the same as the value of directivity determined by Formula 8, and it may be determined by either. When both formulas are used, they act as a check on one another. Accordingly, directivity may be determined in this invention without reversing the position of a directional coupler.

The value of the actual standing wave ratio $P$ may be determined from the maximum and minimum readings of voltmeter 103 which is connected to the nondirectional probe, and is $$P = \frac{V_{max}}{V_{min}} \qquad (9)$$

where $V_{min}$ is the minimum reading and $V_{max}$ is the maximum reading.

In like manner, the "apparent forward standing wave ratio" $P_f$ is determined from the maximum and minimum readings of voltmeter 122 when the directional coupler is in a forward position and is $$P_f = \frac{|V_f|_{max}}{|V_f|_{min}} \quad (10)$$

where $|V_f|_{min}$ is the voltmeter's minimum reading, and $|V_f|_{max}$ is the voltmeter's maximum reading.

Similarly, the "apparent backward standing wave ratio" $P_b$ may be determined from the maximum and minimum readings of voltmeter 122 when the directional coupler is in a backward position, and is $$P_b = \frac{|V_b|_{max}}{|V_b|_{min}} \quad (11)$$

where $|V_b|_{min}$ is the voltmeter's reading and $|V_b|_{max}$ is the voltmeter's minimum reading. The embodiment of Figure 2 is thus used to determine the directivity of directional coupler 116.

The directivity of directional coupler 136 shown in Figure 10 may be determined in the same manner as described above for the embodiment shown in Figure 2 and requires the use of only one of the two nondirectional probes 138 or 139.

It is often desirable to know the insertion loss of a directional coupler. The insertion discontinuity may be determined by use of both nondirectional probes 138 and 139. The probes will sense the magnitude of the standing waves on each side of directional coupler 136 and the difference between the standing wave ratios as indicated by voltmeters 141 and 142 is an indication of the discontinuity and losses caused by the directional coupler.

The frequency sensitivity of a directional coupler may also be calibrated by this invention, as follows: The signal generator frequency is varied in designated increments over a required frequency range. Maximum and minimum readings of the voltmeters in either embodiment are taken at each incremental frequency. Directivity is calculated at each frequency and a curve is plotted showing directivity versus frequency for a particular directional coupler.

It is therefore seen that this invention avoids the requirement in conventional testing means for a perfectly matched load; but, on the other hand, provides exact results with an unmatched load which is intentionally used to obtain standing waves. The invention also avoids slotted waveguide walls with movable probes which often cause difficulty because their mechanical movement causes unpredictable amounts of misalignment which results in uncontrollable output variation. Also, slot resonance, which is an undesirable property of slotted waveguides, is avoided. It is further seen that the invention provides directional coupler testing means which allows directivity to be measured in either forward or backward positions and accordingly does not require a reversal of position. The invention permits the testing of directional couplers that are built in waveguide sections of different diameters. It does not require a buffer pad between the signal generator and input to the invention which is advantageous because of the low power output of high frequency signal generators. The invention further allows measuring of the frequency response and insertion discontinuity of a directional coupler.

While specific embodiments of the invention have been described, various changes and modifications will be obvious to a person skilled in the art which do not depart from the spirit and scope of the invention.

I claim:

1. A tester for a directional coupler built with an insertable section of the transmission line comprising, a transmission line with diametric proportions equal to said insertable section, nondirectional probe means supported by said transmission line, indicating means connected to said probe means, said directional coupler section inserted intermediately in said line, indicating means connected to said directional coupler, an input plunger slideably supported within one end of said line, a signal generator, coupling means supported by said input plunger and connected to said generator in order to couple the energy of said generator into said line, output plunger means slideably supported at the opposite end of said line from said input plunger, mechanical means coupling the input plunger and output plunger means to move them relative to said line, and said input plunger and output plunger means maintained at a constant axial spacing during movement by said mechanical means.

2. A means for testing a directional coupler built with an insertable section of waveguide comprising, a waveguide with diametric proportions equal to said insertable section, nondirectional probe means supported by said waveguide for detecting a standing wave ratio, first indicator means connected to said probe means to indicate said standing wave ratio, said directional coupler section supported in tandem with said waveguide to sense energy within said waveguide, second indicating means connected to said directional coupler to indicate its output, a signal generator, input plunger means slideably supported at one end of said waveguide, coupling means supported by said input plunger and connected to said signal generator to provide energy for transmission down said waveguide, output plunger means slideably supported within the other end of said waveguide to receive the energy transmitted down said waveguide, a load connected to said output plunger means, mismatching means supported by said output plunger means to provide standing waves within said waveguide, and means for mechanically coupling said input plunger and said output plunger means to maintain them with constant axial spacing as they are moved reciprocatively within said waveguide to move said standing wave past said probe and said coupler.

3. A directional coupler tester comprising, a waveguide, a nondirectional probe supported by said waveguide to detect energy transmitted by said waveguide, an insertable section of waveguide with diametric proportions equal to said waveguide and supported intermediately in said waveguide, a directional coupler supported by said insertable section to sense substantially unidirectional energy in said waveguide, a first indicating means connected to said nondirectional probe to indicate the magnitude of its output, second indicating means connected to said directional coupler to indicate the magnitude of its output, an input plunger supported slideably within one end of said waveguide, energy coupling means supported by said input plunger, a signal generator connected to said coupling means to provide high frequency energy in said waveguide, an output plunger supported slideably at the opposite end of said waveguide from said input plunger, mismatching means connected to said output plunger to provide standing waves in said line, and mechanical means coupling said input plunger and said output plunger to maintain them with constant axial spacing during their movement relative to said waveguide.

4. A tester for a directional coupler comprising, a waveguide, an input plunger supported slideably in one end of said waveguide, a coupling loop fixed to said input plunger for transmitting energy to said waveguide, a signal generator of high frequency energy connected to said coupling loop, an output plunger supported slideably within the other end of said waveguide from said input plunger, mismatching means supported by said output plunger to provide standing waves between said output plunger and input plungers, mechanically coupling means connected to said input plunger and output plunger to move them relative to said waveguide while maintaining a constant axial spacing between them, said standing wave remaining constant and moving with said plungers relative to said waveguide, a plurality of insertable sections of waveguide supported intermediately in said waveguide and with the same diametric configuration as said waveguide, a nondirectional probe supported by one of said insertable sections to sense the standing wave, indicating means connected to said nondirectional probe to indicate the standing wave ratio, the directional coupler supported within a second of said insertable sections, and indicating means attached to said directional coupler to indicate its output.

5. A tester for a directional coupler comprising, a waveguide, an input plunger supported slideably in one end of said waveguide, a coupling loop fixed to said input plunger for transmitting energy to said waveguide, a signal generator of high frequency energy connected to said coupling loop, an output plunger supported slideably within the other end of said waveguide from said input plunger, mismatching means supported by said output plunger to provide standing waves between said output and input plunger, mechanical coupling means connected to said input plunger and output plunger to move them relative to said waveguide while maintaining constant axial spacing between them, said standing wave remaining constant and moving with said plunger relative to said waveguide, a plurality of insertable sections of waveguide supported intermediately in said waveguide, and having the diametric configuration of said waveguide, a nondirectional probe supported by one of said insertable sections, indicating means connected to said nondirectional probe to indicate the standing wave ratio, the directional coupler supported within a second of said insertable sections, indicating means connected to directional coupler, a second nondirectional probe supported by a third of said insertable sections, a second indicating means connected to said second probe to indicate its sensing of standing wave ratio.

6. A tester for a directional coupler comprising, a waveguide with an intermediate opening, an input plunger supported slideably in one end of said waveguide, a coupling loop fixed to said input plunger for transmitting energy to said waveguide, a signal generator of high frequency energy connected to said coupling loop, an output plunger supported slideably within the other end of said waveguide from said input plunger, mismatching means supported by said output plunger to provide standing waves between said input and output plunger, mechanical means connecting said input and output plunger to move them relative to said waveguide while maintaining constant longitudinal spacing between them, a plurality of insertable sections of waveguide serially supported in the intermediate opening of said waveguide, a first nondirectional probe supported by a first of said insertable sections, a first indicating means connected to said first probe to indicate its sensed standing wave ratio, a second nondirectional probe supported by a second of said insertable sections, a second indicating means connected to said second probe to indicate its sensed standing wave ratio, the directional coupler supported by a third of said insertable sections between said first and said second probe sections, third indicating means connected to said directional coupler to indicate its output, said directional coupler section having a different diameter from said input and output sections, said first and second nondirectional probe portions tapered with uniform diametric proportions to provide a uniform change of diameter along said transmission line to maintain the same characteristic impedance.

7. A tester for a directional coupler comprising, a base plate, a waveguide supported by said base plate, said waveguide comprised with an input portion at one end, an output portion at the opposite end, a nondirectional probe portion, and a directional coupler portion, said probe portion and said coupler portion supported between said input and output portions, an input plunger slideably supported within said input portion, coupling means supported by said input plunger, a signal generator connected to said coupling means, an output plunger assembly slideably supported within said output portion, a load connected to said output plunger assembly, means connecting said input plunger and output plunger assembly for moving them in constant spaced relationship relative to said waveguide portions, a nondirectional probe supported by said probe portion, the directional coupler supported by said directional coupler portion, a first indicating means connected to said nondirectional probe, and a second indicating means connected to said directional coupler.

8. A tester for directional couplers comprising, a base plate, an input portion of waveguide supported by said base plate, an output portion of waveguide supported by said base plate in axial alignment with said input portion and spaced therefrom, a plurality of sections of waveguide insertable between said input and output portions with matched characteristic impedance, a nondirectional probe fixed in one of said portions, the directional coupler fixed in another of said portions, a first indicating means connected to said nondirectional probe to indicate the standing wave in said line, a second indicating means connected to said directional coupler to indicate its output, an input plunger supported by said input portions, coupling means for high frequency energy mounted on said input plunger, a signal generator connected to said coupling means to provide high frequency energy to said waveguide, an output plunger assembly slideably supported within said output portion, an adjustable stub included within said output plunger assembly, a load connected to said output plunger assembly in parallel with said adjustable stub, mechanical coupling means connecting said input plunger and said output plunger assembly for moving them longitudinally of said waveguide portions, and said mechanical means maintaining said input plunger and output plunger assembly with constant axial spacing during their movement.

9. A tester for directional couplers comprising, a base plate, an input portion of waveguide supported by said base plate, an output portion of waveguide supported by said base plate in axial alignment with said input portion and spaced therefrom, a first tapered portion of waveguide with one end mounted to said input portion, a second tapered portion of waveguide with one end mounted to said output portion, an insertable waveguide portion mounted between said tapered portions, said tapered portions providing a uniform change of diameter between said insertable portion and said input and output portions, all of said waveguide portions designed with equal characteristic impedance, an input plunger slideably received in said input portion, coupling means supported by said input plunger, a signal generator connected to said coupling means, an output plunger assembly slideably supported within said output portion, an adjustable stub included within said output plunger assembly, a load connected to said output plunger assembly in parallel with said adjustable stub to receive the output of said waveguide, mechanical means connected to said input plunger and output plunger assembly to move them relative to said waveguide, said mechanical means maintaining said input plunger and output plunger assembly with constant longitudinal spacing during their movement, the directional coupler mounted in said insertable portion, a first non-directional probe mounted in said first tapered portion, and indicating means connected to said non-directional probe and directional coupler to indicate their respective outputs.

10. A tester for directional couplers comprising, a base plate, an input portion of waveguide supported by said base plate, an output portion of waveguide supported by said base plate in axial alignment with said input portion and spaced therefrom, a first tapered portion of waveguide with one end mounted to said input portion, a second tapered portion of waveguide with one end mounted to said output portion, an insertable portion of waveguide mounted between said tapered portions, said tapered portions providing a uniform change of diameter between the insertable portion and said input and output portions, an input plunger slideably received in said input portion, electrical coupling means supported by said input plunger, a signal generator connected to said coupling means, an output plunger assembly slideably supported in said output portion, adjustable stub mounted in said output plunger assembly, a load connected to said output plunger assembly in parallel with said adjustable stub to receive the output of said waveguide, mechanical means connected to said input plunger and output plunger assembly to move them relative to said waveguide, said mechanical means maintaining said input plunger and output plunger assembly with constant longitudinal spacing during their movement, the directional coupler mounted in said inserted section, indicating means connected to said directional coupler to indicate its output, first and second nondirectional probes mounted in said waveguide on opposite sides of said directional coupler, and indicating means connected to said first and second probes.

11. A tester for a directional coupler comprising, a waveguide transmission line supporting said directional coupler, a nondirectional probe supported in said waveguide, means for generating high frequency energy, coupling means connecting said high frequency energy to one end of said transmission line, mismatching means located at the other end of said transmission line to provide a standing wave in said line, means for moving said standing wave relative to said directional coupler and said nondirectional probe, wherein the same standing wave energizes both the directional coupler and the nondirectional probe, and means for indicating the outputs of said directional coupler and said nondirectional probe.

12. A tester for a directional coupler that is supported in an insertable section of waveguide comprising, a waveguide transmission line with an intermediate opening that serially receives the insertable section, said insertable section having a diameter different from the diameter at the ends of said transmission line, said transmission line having tapered portions adjacent the insertable section to maintain a uniform characteristic impedance through the transmission line and insertable section, means for generating high frequency energy, coupling means connecting said high frequency energy to one end of said transmission line, mismatching means located at the other end of said transmission line to provide a substantially uniform standing wave in said transmission line, a nondirectional probe supported in said waveguide to sense the standing wave ratio in said transmission line, means for moving said standing wave relative to said transmission line, wherein the same standing wave energizes both the directional coupler and the nondirectional probe, and voltage indicating means connected to said directional coupler and nondirectional probe for determining the respective ratios of voltage variation for each.

References Cited in the file of this patent

UNITED STATES PATENTS 2,459,197     Stewart _____ Jan. 18, 1949
2,649,570     Radcliffe _____ Aug. 18, 1953

OTHER REFERENCES

"Precision Measurement of Waveguide Attenuation," Vogelman, Electronics, December 1953, pages 196–199.